United States Patent
Jeong

(10) Patent No.: US 12,490,181 B2
(45) Date of Patent: *Dec. 2, 2025

(54) METHOD AND APPARATUS FOR ENHANCING NETWORK SELECTION ACCURACY IN WIRELESS COMMUNICATION SYSTEM

(71) Applicant: Samsung Electronics Co., Ltd., Suwon-si (KR)

(72) Inventor: Sangsoo Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/393,366

(22) Filed: Dec. 21, 2023

(65) Prior Publication Data

US 2024/0172103 A1 May 23, 2024

Related U.S. Application Data

(63) Continuation of application No. 17/176,233, filed on Feb. 16, 2021, now Pat. No. 11,856,508.

(30) Foreign Application Priority Data

Feb. 17, 2020 (KR) .......... 10-2020-0019264
Mar. 20, 2020 (KR) .......... 10-2020-0034678

(51) Int. Cl.
*H04W 48/18* (2009.01)
*H04W 8/02* (2009.01)
(Continued)

(52) U.S. Cl.
CPC ............. *H04W 48/18* (2013.01); *H04W 8/02* (2013.01); *H04W 24/02* (2013.01); *H04W 48/16* (2013.01); *H04W 88/182* (2013.01)

(58) Field of Classification Search
CPC ....... H04W 48/18; H04W 8/02; H04W 24/02; H04W 48/16; H04W 88/182; H04W 8/065; H04W 88/14

See application file for complete search history.

(56) References Cited

U.S. PATENT DOCUMENTS

| | | |
|---|---|---|
| 6,044,264 A | 3/2000 | Huotari et al. |
| 10,595,268 B2 | 3/2020 | Lee et al. |

(Continued)

FOREIGN PATENT DOCUMENTS

| | | |
|---|---|---|
| CN | 1166908 A | 12/1997 |
| CN | 1479497 A | 3/2004 |

(Continued)

OTHER PUBLICATIONS

International Search Report of the International Searching Authority in connection with International Application No. PCT/KR2021/001810 issued May 28, 2021, 3 pages.

(Continued)

*Primary Examiner* — Marcus Hammonds

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. Provided are a method and apparatus for selecting a network functional entity from a plurality of network functional entities.

20 Claims, 16 Drawing Sheets

(51) Int. Cl.
  *H04W 24/02* (2009.01)
  *H04W 48/16* (2009.01)
  *H04W 88/18* (2009.01)

(56) References Cited

U.S. PATENT DOCUMENTS

| | | | |
|---|---|---|---|
| 11,224,009 | B2 | 1/2022 | Krishan et al. |
| 11,856,508 | B2* | 12/2023 | Jeong ............... H04W 48/16 |
| 11,991,036 | B2 | 5/2024 | Wang |
| 12,022,304 | B2 | 6/2024 | Wang |
| 2008/0287150 | A1 | 11/2008 | Jiang et al. |
| 2016/0127539 | A1 | 5/2016 | Sharma |
| 2019/0230556 | A1 | 7/2019 | Lee |
| 2019/0251241 | A1 | 8/2019 | Bykampadi et al. |
| 2021/0075631 | A1 | 3/2021 | Liao |
| 2021/0144217 | A1 | 5/2021 | Liu |
| 2021/0168215 | A1 | 6/2021 | Zong et al. |
| 2021/0250172 | A1 | 8/2021 | Choyi et al. |
| 2021/0367916 | A1 | 11/2021 | Belling et al. |
| 2021/0377754 | A1 | 12/2021 | Marquezan et al. |
| 2022/0295386 | A1 | 9/2022 | Lu et al. |
| 2023/0006888 | A1* | 1/2023 | Turina ............ H04L 41/0853 |

FOREIGN PATENT DOCUMENTS

| | | |
|---|---|---|
| CN | 110072273 A | 7/2019 |
| CN | 110234140 A | 9/2019 |
| CN | 110603830 A | 12/2019 |
| WO | 2019162862 A1 | 8/2019 |
| WO | 2020020474 A1 | 1/2020 |

OTHER PUBLICATIONS

3rd Generation Partnership Project; Technical Specification Group Core Network and Terminals; 5G System; Network Function Repository Services; Stage 3 (Release 16) 3GPP TS 29.510 V16.2.0, Dec. 2019, 164 pages.

3rd Generation Partnership Project; Technical Specification Group Services and System Aspects; System architecture for the 5G System (5GS); Stage 2 (Release 16) 3GPP TS 23.501 V16.3.0, Dec. 2019, 410 pages.

European Search Report issued Jul. 5, 2021, in connection with a counterpart European Patent Application No. 21156926.4, 12 pages.

Huawei et al., "SCP registration in NRF", 3GPP TSG-SA WG2 Meeting #135, S2-1910225, Oct. 14-18, 2019, Split Croatia, 4 pages.

3rd Generation Partnership Project; Technical Specification Group Services and System Aspects; Procedures for the 5G System (5GS); Stage 2 (Release 16) 3GPP TS 23.502 V16.2.0, Sep. 2019, 530 pages.

3rd Generation Partnership Project; Technical Specification Group Services and System Aspects; System Architecture for the 5G System; Stage 2 (Release 16) 3GPP TS 23.501 V16.0.2, Apr. 2019, 317 pages.

Oracle Corporation et al., "Enablers for multiple SCPs (23.502)", CHANGE REQUEST, 3GPP TSG-SA2 Meeting #138-E, Apr. 20-23, 2020, S2-2003193R17, 14 pages.

Communication pursuant to Article 94(3) EPC dated Jan. 24, 2023 in connection with European Patent Application No. 21 156 926.4, 10 pages.

Notice of Allowance issued Oct. 7, 2024, in connection with Japanese Patent Application No. 2022-549525, 7 pages.

The Second Office Action issued Oct. 31, 2024, in connection with Chinese Patent Application No. 202180015066.6, 28 pages.

Communication under Rule 71(3) EPC issued Dec. 4, 2024, in connection with European Patent Application No. 21156926.4, 60 pages.

3GPP TS 23.502 V16.3.0 (Dec. 2019) Technical Specification, 3rd Generation Partnership Project; Technical Specification Group Services and System Aspects; Procedures for the 5G System (5GS); Stage 2 (Release 16), Dec. 2019, 558 pages.

Oracle Corporation et al., "Enablers for multiple SCPs (23.502)," S2-2003270 (Was S2-2003193r09), 3GPP TSG SA WG2 #138-E, Online, Apr. 20-23, 2020, 7 pages.

Deutsche Telekom AG et al., "Introduction of indirect communication between NF services, and implicit discovery," S2-1901260, 3GPP TSG-SA2 Meeting #130, Kochi, India, Jan. 21-25, 2019, 17 pages.

Notification of Fulfilling of Registration Formality issued Feb. 21, 2025, in connection with Chinese Patent Application No. 202180015066. 6, 9 pages.

Secretary of SA WG2, "Draft Report of SA WG2 meetings #131," S2-1902938, SA WG2 Meeting #S2-132, Xian, China, Apr. 8-12, 2019.

Office Action dated May 27, 2025 in connection with Korean application No. 10-2020-0034678, 10 pages.

\* cited by examiner

METHOD AND APPARATUS FOR ENHANCING NETWORK SELECTION ACCURACY IN WIRELESS COMMUNICATION SYSTEM

CROSS-REFERENCE TO RELATED APPLICATIONS

This application is a continuation application of application Ser. No. 17/176,233 filed on Feb. 15, 2021, now U.S. Pat. No. 11,856,508 issued Dec. 26, 2023, which is based on and claims priority under 35 U.S.C. 119 to Korean Patent Application No. 10-2020-0019264 filed on Feb. 17, 2020, and Korean Patent Application No. 10-2020-0034678 filed on Mar. 20, 2020 in the Korean Intellectual Property Office, the disclosures of which are herein incorporated by reference in their entirety.

BACKGROUND

1. Field

The disclosure relates to a method of increasing the accuracy of network selection set in a wireless communication system. More specifically, the disclosure relates to a method of selecting a network functional entity from a plurality of network functional entities in a next generation wireless communication system.

2. Description of Related

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 gigaHertz (GHz) bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid Frequency Shift Key (FSK) and Quadrature Amplitude Modulation (QAM) Modulation (FOAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

With the development of various information technology (IT) technologies, network equipment has evolved into a virtualized network function (NF, hereinafter, may be used interchangeably with a 'network element') by applying virtualization technology, and virtualized NFs may be implemented in a software form without physical limitations to be installed/operated in various types of clouds or data centers (DCs). In particular, the NF may be freely expanded, scaled, initiated, or terminated according to service requirements, a system capacity, or a network load. It should be noted that even if these NFs are implemented in a software form, the NFs do not exclude physical configurations, because the NFs should be basically driven on a physical configuration, for example, a fixed equipment. Further, NFs may be implemented only with a simple physical configuration, that is, hardware.

In order to support various services in these various network structures, network slicing technology has been introduced. Network slicing is a technology that logically configures a network as a set of network functions (NF) for supporting a specific service and that separates the network from other slices. One terminal may access two or more slices when receiving various services.

SUMMARY

Aspects of the disclosure are to address at least the above-mentioned problems and/or disadvantages and to provide at least the advantages described below. Accordingly, an aspect of the disclosure is to provide a method and apparatus for effectively managing a network configured with network slices for supporting various services, and selecting a specific network element from a plurality of network elements.

In accordance with an aspect of the disclosure, a method performed by a service communication proxy (SCP) entity in a wireless communication system is provided. The method comprises transmitting, to a network repository function (NRF) entity, a network function (NF) register request message including an SCP profile of the SCP entity, and receiving, from the NRF entity, an NF register response message including a result of a registration for the SCP entity, wherein the SCP profile is maintained at the NRF entity.

In the method, the SCP profile may include a type of NF for the SCP entity, an NF identifier of the SCP entity, and an address of the SCP entity, and the type of NF for the SCP entity may be set to an SCP.

In the method, the SCP profile includes at least one of a network slice related identifier associated with the SCP entity, SCP domain information associated with another SCP entity interconnected with the SCP entity, or NF set information associated with an NF entity served by the SCP entity.

In addition, the method further comprises transmitting, to the NRF entity, an NF discovery request message associated with a producer NF entity, and receiving, from the NRF entity, an NF discovery response message including information associated with the producer NF entity.

In accordance with another aspect of the disclosure, a service communication proxy (SCP) entity in a wireless communication system is provided. The SCP entity comprises a transceiver, and a controller coupled with the transceiver and configured to: transmit, to a network repository function (NRF) entity, a network function (NF) register request message including an SCP profile of the SCP entity, and receive, from the NRF entity, an NF register response message including a result of a registration for the SCP entity, wherein the SCP profile is maintained at the NRF entity.

In accordance with another aspect of the disclosure, a method performed by a network repository function (NRF) entity in a wireless communication system is provided. The method comprises receiving, from a service communication proxy (SCP) entity, a network function (NF) register request message including an SCP profile of the SCP entity, maintaining the SCP profile based on the NF register request message, and transmitting, to the SCP entity, an NF register response message including a result of a registration for the SCP entity.

In accordance with another aspect of the disclosure, a network repository function (NRF) entity in a wireless communication system is provided. The NRF entity comprises a transceiver, and a controller coupled with the transceiver and configured to: receive, from a service communication proxy (SCP) entity, a network function (NF) register request message including an SCP profile of the SCP entity, maintain the SCP profile based on the NF register request message, and transmit, to the SCP entity, an NF register response message including a result of a registration for the SCP entity.

According to the disclosed embodiment, radio resources can be efficiently used and various services can be efficiently provided to a user by managing a plurality of network functional entities in a set unit and by selecting a network functional entity from the set.

Further, according to an embodiment, the user can efficiently access to the network functional entity by efficiently searching for a plurality of network functional entities that provide various services.

Other aspects, advantages, and salient features of the disclosure will become apparent to those skilled in the art from the following detailed description, which, taken in conjunction with the annexed drawings, discloses various embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
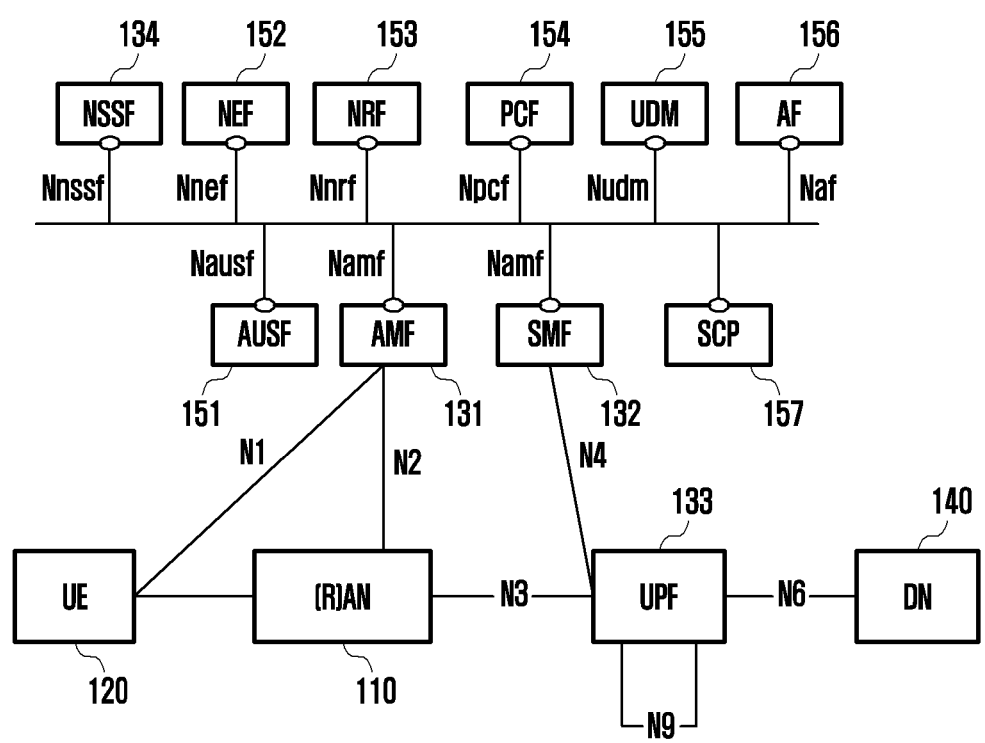
FIG. 1 illustrates a block diagram of a configuration of a wireless communication system according to various embodiments of the disclosure.

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Terms used in the disclosure are used for describing a specific embodiment and do not limit a range of another embodiment. Unless the context otherwise clearly indicates, words used in the singular include the plural, and the plural includes the singular. Terms used here including a technical or scientific term have the same meaning as that which may be generally understood by a person of common skill in the art. Terms defined in a general dictionary among terms used in the disclosure may be interpreted as the same meaning as or a meaning similar to that in a context of related technology, and unless it is clearly defined in the disclosure, the term is not interpreted as having an ideal or excessively formal meaning. In some cases, a term defined in the disclosure cannot be interpreted to exclude the embodiments of the disclosure.

In various embodiments of the disclosure described below, a hardware approach method is described as an example. However, because various embodiments of the disclosure include technology using both hardware and software, various embodiments of the disclosure do not exclude a software-based approach method.

Hereinafter, preferred embodiments according to the disclosure will be described in detail with reference to the attached drawings. The same reference numbers are used throughout the drawings to refer to the same or like parts.

Further, detailed descriptions of well-known functions and structures incorporated herein may be omitted to avoid obscuring the subject matter of the disclosure.

When describing an embodiment in this specification, a description of technical contents well known in the art of the disclosure and not directly related to the disclosure will be omitted. This is to clearly describe the subject matter of the disclosure, without obscuring the subject matter, by omitting any unnecessary description.

Similarly, in the attached drawings, some constituent elements are shown in an exaggerated or schematic form or are omitted. Further, a size of each constituent element does not entirely reflect an actual size. The same reference numerals designate the same components in the drawings.

These advantages and features of the disclosure and a method of accomplishing them will become more readily apparent from the detailed description given hereinafter together with the accompanying drawings. However, the disclosure is not limited to the following embodiments, and it may be implemented in different forms. The present embodiments enable the complete disclosure of the disclosure and are provided to enable complete knowledge of the scope of the disclosure to those skilled in the art, and the disclosure is defined by the scope of the claims. The same reference numerals designate the same components throughout the specification.

Herein, it may be understood that each block of a flowchart and combinations of the flowchart may be performed by computer program instructions. Because these computer program instructions may be mounted in a processor of a universal computer, a special computer, or other programmable data processing equipment, the instructions performed through a processor of a computer or other programmable data processing equipment generate a means that performs functions described in a block(s) of the flowchart. In order to implement a function with a specific method, because these computer program instructions may be stored at a computer available or computer readable memory that can direct a computer or other programmable data processing equipment, instructions stored at the computer available or computer readable memory may produce a production item including an instruction means that performs a function described in block(s) of the flowchart. Because computer program instructions may be mounted on a computer or other programmable data processing equipment, a series of operation steps are performed on the computer or other programmable data processing equipment and generate a process executed with the computer, and instructions that performs the computer or other programmable data processing equipment may provide steps for executing functions described in block(s) of the flowchart.

Further, each block may represent a portion of a module, segment, or code including at least one executable instruction for executing a specific logical function(s). Further, in several replaceable execution examples, it should be noted that functions described in blocks may be performed regardless of order. For example, two consecutively shown blocks may be substantially simultaneously performed or may be sometimes performed in reverse order according to a corresponding function.

In this case, the term "-unit" used in the present embodiment means a software or hardware component such as a field programmable gate array (FPGA) or an application specific integrated circuit (ASIC) and performs any function. However, "-unit" is not limited to software or hardware. The "-unit" may be configured to store at a storage medium that can address and be configured to reproduce at least one processor. Therefore, "-unit" includes, for example, components such as software components, object-oriented software components, class components, and task components, processes, functions, attributes, procedures, subroutines, segments of a program code, drivers, firmware, microcode, circuit, data, database, data structures, tables, arrays, and variables. A function provided within constituent elements and "-units" may be performed by coupling the smaller number of constituent elements and "-units" or by subdividing the constituent elements and "-units" into additional constituent elements and "-units". Further, constituent elements and "-units" may be implemented in a manner to reproduce at least one CPU within a device or a security multimedia card.

Hereinafter, the disclosure relates to a method and apparatus for supporting various services in a wireless communication system. Specifically, the disclosure describes technology for supporting various services by supporting mobility of a UE in a wireless communication system.

A term for identifying an access node used in the following description, a term referring to a network entity or a network function (NF), a term referring to messages, a term referring to an interface between network objects, and terms referring to various identification information are illustrated for convenience of description. Therefore, the disclosure is not limited to terms to be described later, and other terms referring to objects having an equivalent technical meaning may be used.

Hereinafter, for convenience of description, the disclosure uses terms and names defined in 3rd Generation Partnership Project Long Term Evolution (3GPP LTE) and 5G standards. However, the disclosure is not limited by the terms and names, and may be equally applied to systems conforming to other standards.

In the disclosure, targets for exchanging information for access control and state management will be collectively described as NF. The NF may be at least one of, for example, an access and mobility management function (hereinafter, referred to as AMF) device, a session management function (hereinafter, referred to as SMF) device, and a network slice selection function (hereinafter, referred to as NSSF) device. However, embodiments of the disclosure may be equally applied even when the NF is actually implemented as an instance (AMF instance, SMF instance, NSSF instance, etc.).

In the disclosure, the instance may mean a state that a specific NF exists in the form of a software code and in which physical or/and logical resources may be allocated from a computing system to be executed in order to perform a function of the NF in a physical computing system, for example, a specific computing system existing on a core network. Therefore, each instance of all NFs, such as an AMF instance and an SMF instance, may mean that physical or/and logical resources may be allocated and used for an NF operation from a specific computing system existing on the core network. As a result, when NF devices such as a physical AMF and SMF exist, NF instances receiving allocation of physical or/and logical resources for an NF operation and using the physical or/and logical resources from a specific computing system existing on the network may perform the same operation.

FIG. 1 illustrates a wireless communication system according to various embodiments of the disclosure.

With reference to FIG. 1, as some of nodes using a radio channel in a wireless communication system, a radio access node (RAN) 110 and a user equipment (UE) 120 are illustrated. FIG. 1 illustrates only one RAN 110 and one UE 120, but another RAN that is the same as or similar to the RAN 110 may be further included. Further, FIG. 1 illustrates only a case in which only one UE 120 communicates within one RAN 110. However, it is obvious that a plurality of UEs can actually communicate within one RAN 110.

The RAN 110 is a network infrastructure that provides wireless access to the UE 120. The RAN 110 has coverage defined as a certain geographic area based on a distance that may transmit a signal (not illustrated in FIG. 1). In addition to the RAN, the RAN 110 may be referred to as an 'access point (AP)', 'eNodeB (eNB)', '5th generation node (5G node)', 'wireless point', a 'transmission/reception point (TRP)', or another term having an equivalent technical meaning.

The UE 120 is a device used by a user and performs communication with the RAN 110 through a wireless channel. In some cases, the UE 120 may operate without user involvement. For example, the UE 120 is a device that performs machine type communication (MTC) and may not be carried by a user. The UE 120 illustrated in FIG. 1 may include at least one user portable device, and include at least one MTC. The UE 120 of FIG. 1 may be referred to as a 'terminal', 'mobile station', 'subscriber station', 'remote terminal', 'wireless terminal', 'user device', or another term having an equivalent technical meaning.

An AMF device 131 may be a network entity that manages wireless network access and mobility for the UE 120. An SMF device 132 may be a network entity that manages connection of a packet data network for providing packet data to the UE 120. The connection between the UE 120 and the SMF 132 may be a PDU session.

A user plane function (hereinafter, referred to as an UPF) device 133 may be a gateway or a network entity serving as a gateway that transfers a packet transmitted and received by the UE 120. The UPF device 133 may be connected to a data network (DN) 140 connected to Internet to provide a path for transmitting and receiving data between the UE 120 and the DN 140. Accordingly, the UPF device 133 may route data to be transmitted by Internet among packets transmitted by the UE 120 with an Internet data network.

A network slice selection function (NSSF) device 134 may be a network entity that performs a network selection operation described in the disclosure, for example, a network slice selection operation. The operation of the NSSF device 134 will be described in more detail in the drawings to be described later.

An authentication server function (AUSF) device 151 may be an equipment (network entity) that provides a service for subscriber authentication processing.

A network exposure function (NEF) device 152 may access information for managing the UE 120 in a 5G network and may be a network entity that may subscribe to a mobility management event of the UE, subscribe to a session management event of the UE, request session-related information, set charging information of the corresponding UE, request to change a PDU session policy of the UE, and transmit small data about the UE.

A network repository function (NRF) device 153 may be a network entity (NF) having a function of storing state information of NFs and processing a request for finding an NF to which other NFs can access.

A policy and charging function (hereinafter, referred to as a PCF) device 154 may be a network entity that applies a service policy and a charging policy of a mobile communication service provider to the UE 120, and a policy for a PDU session.

A unified data management (hereinafter, referred to as UDM) device 155 may be a network entity that stores information on a subscriber or/and the UE 120.

An application function (AF) device 156 may be a network entity (NF) having a function of providing services to users by interworking with a mobile communication network.

A service communication proxy (SCP) device 157 is an NF that provides functions such as NF discovery for communication between NFs and message transfer between NFs. The SCP device 157 may operate in an integrated form with the NRF device 153 according to the provider's selection, and in this case, the SCP device 157 includes a function of the NRF device 153, or conversely, the NRF device 153 may include a function of the SCP device 157.

Hereinafter, for convenience of description, targets for exchanging information for access control and state management will be collectively described as an NF. The NF may be one of the NF devices such as, for example, an access and mobility management function (hereinafter, referred to as an AMF) device, a session management function (hereinafter, referred to as an SMF) device, and a network slice selection function (NSSF) device. However, the embodiments of the disclosure may be equally applied even when the NF is actually implemented as an instance (AMF instance, SMF instance, NSSF instance, etc.).

When the number of RANs in the network is large or when the number of NFs (e.g., AMF) of a core network that needs to receive configuration information of the RAN is large, a signaling overload occurs, or a situation may arise in which network configuration information is inconsistent or conflicts because of the difference in transmission and processing time of signaling. Further, when the RAN needs to select the NF of the core network using a specific service, a network configuration state, or slice information, it is not efficient to reflect all such information or changes to the RAN.

In the disclosure, technology that may be used for effectively exchanging configuration information between a RAN and a core network and selecting an appropriate core network according to a service type or slice is proposed.

Figure 2:
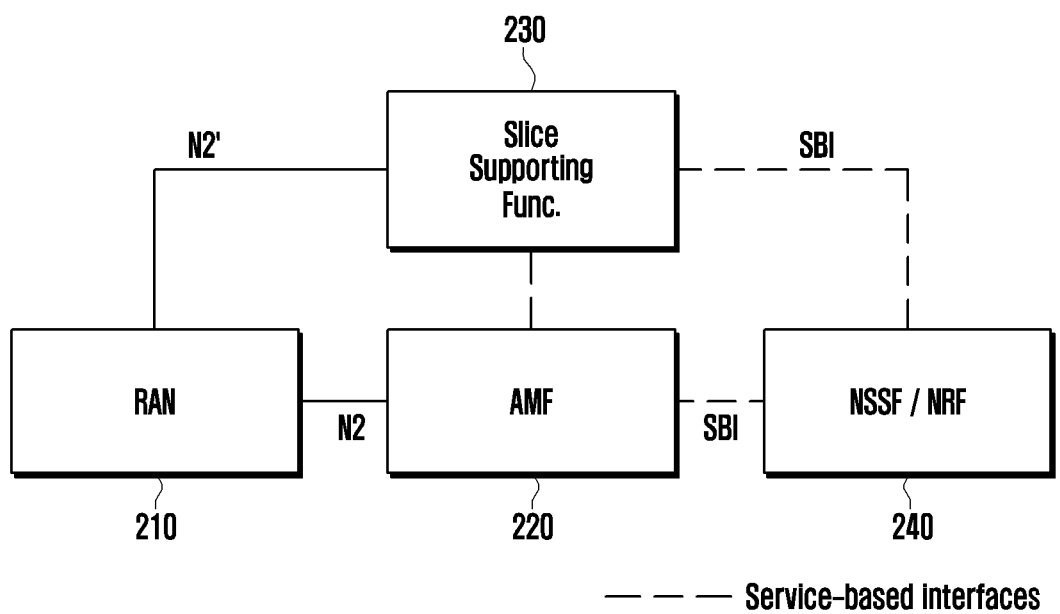
FIG. 2 illustrates a block diagram of a configuration of a network structure according to an embodiment of the disclosure.

FIG. 2 illustrates a block diagram of a configuration of a network configuration according to an embodiment of the disclosure.

The network configuration includes an NF (in the disclosure, referred to as a slice supporting function (SSF)) 230 for transmitting information of a RAN 210 related to the network slice to the core network or selecting an AMF 220 capable of supporting the network slice. In this embodiment, the SSF 230 operates as an NF of the core network and is interconnected with the RAN 210 as an N2' (or S1') interface and other core network NFs 220 and 240 as a service-based interface (SBI).

Figure 3:
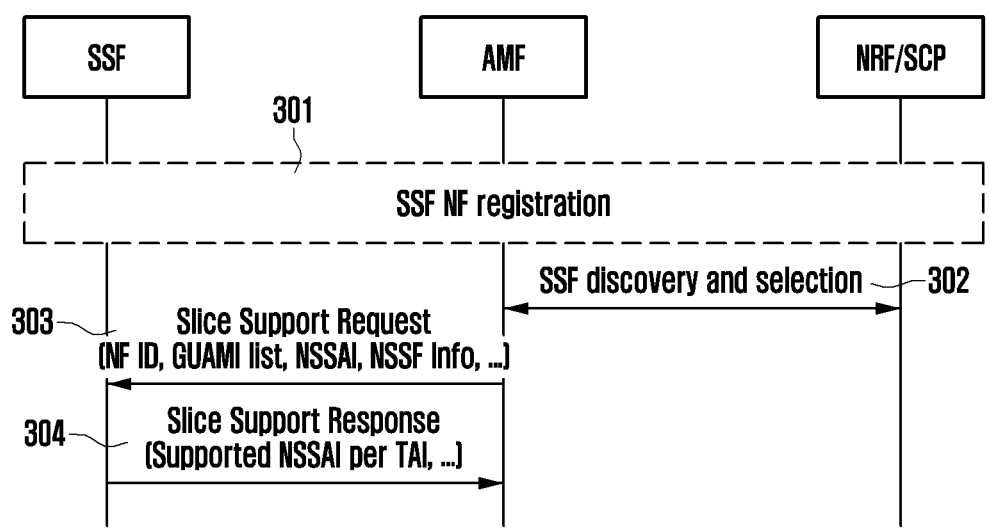
FIG. 3 illustrates a message flow diagram of an operation for interworking an SSF with a network according to an embodiment of the disclosure.

FIG. 3 illustrates a message flow diagram of an operation for interworking an SSF with a network according to an embodiment of the disclosure.

With reference to FIG. 3, the SSF may perform an NF registration process for providing and using a service with the NRF (or SCP) through the SBI (301). The SSF may transfer an NF Profile (NF type=SSF, access address, instance ID, capability, support public land mobile network (PLMN) ID, support area, support AMF set information, support S-NSSAI information, etc.) thereof to the NRF.

The AMF may use a service provided by the SSF or perform a process and operation for selecting the SSF in order to transmit information to the SSF (302). When there is no previously selected SSF and the AMF does not have sufficient information for SSF selection, the AMF may perform an SSF discovery process through the NRF or the SCP and receive information for selecting the SSF.

The AMF may request a service for storing network slice information supported by itself at the SSF (303). The request message may include an NF instance ID of the AMF, a list of Globally Unique AMF IDs (GUAMI) supported by the AMF, support NSSAI, and information of an NSSF to be interconnected. The information of the NSSF may include one or more of an IP address of the NSSF or a fully qualified domain name (FQDN) that may search for the NSSF. Thereafter, the SSF may store information of the corresponding AMF and use the information for a slice selection operation.

The SSF may transmit a response message including network slice information supported by the RAN interconnected with the AMF to the AMF using information received from the RAN (304). In this case, in order to selectively configure target slice information available in the AMF among information received from the RAN, the SSF may use GUAMI information, an AMF region or an AMF region, and AMF set information transferred by the AMF. The AMF may store information received from the SSF, and use the information for adding/updating NSSAI availability info to the NS SF or for performing slice-related operations.

Figure 4:
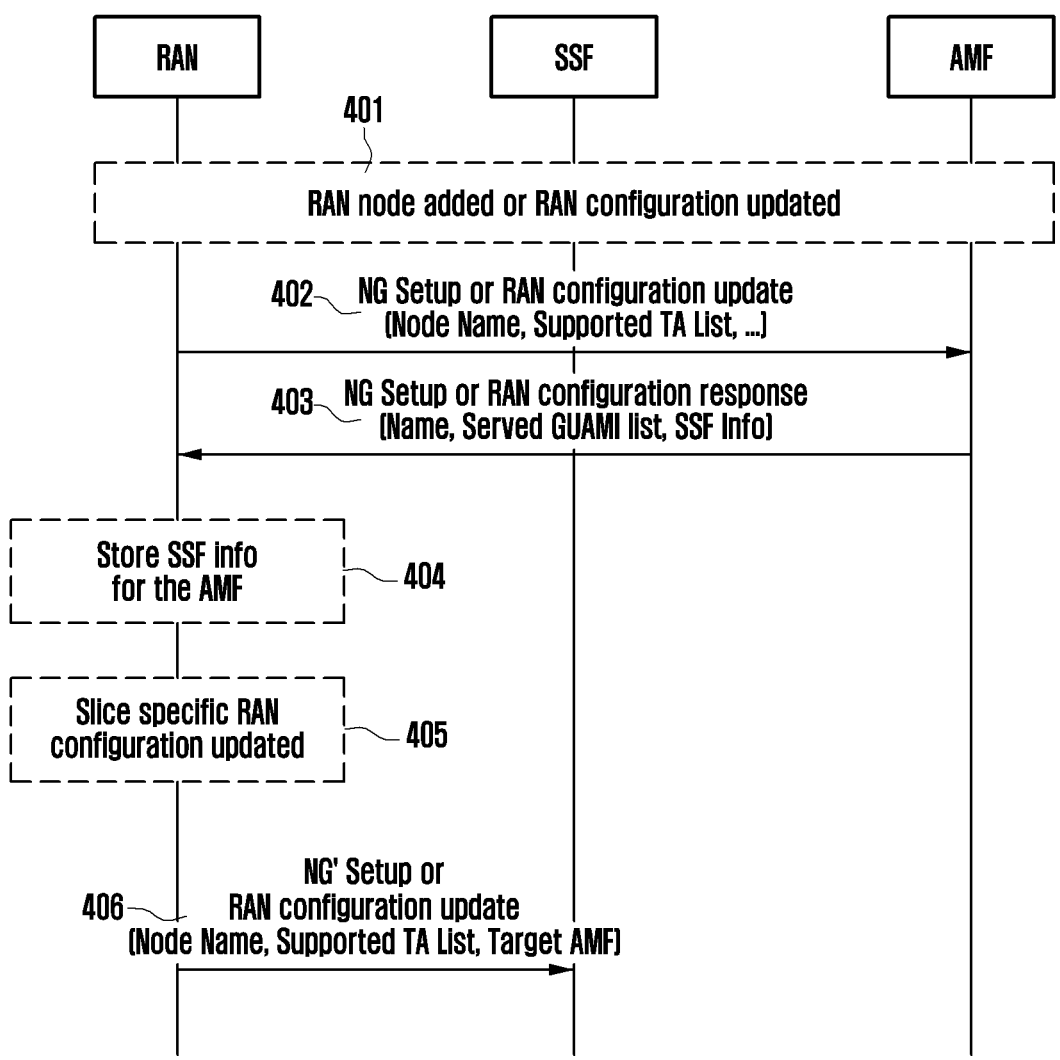
FIG. 4 illustrates a message flow diagram of an operation for interworking an SSF with a RAN.

FIG. 4 illustrates a message flow diagram of an operation for interworking an SSF with a RAN.

With reference to FIG. 4, the operation for interworking the SSF with the RAN is as follows. A new RAN is added to the network or a configuration of the RAN is updated (401).

The RAN may perform a RAN setup procedure when a new relationship and connection for a network configuration and management with the AMF is required, or may perform a RAN configuration update procedure when there is an existing connection (402). In this case, a request message transmitted by the RAN may include a name and an identifier of the RAN, and a list of TAs supported by the RAN. The list of TAs may include one or more S-NSSAI supported by the corresponding TA for each TA. Further, the RAN may include an indicator indicating whether it supports a slice management selection operation using the SSF in the request message.

The AMF may transmit a response message to a request from the RAN. In this case, the response message may include configuration information of the AMF, and include a name of the AMF, a list of GUAMIs supported by the AMF, and information on the SSF to which the RAN will access (403). The response message transmitted by the AMF may include an indicator indicating whether the AMF supports a slice management and selection function using the SSF. The information of the SSF to which the RAN will access may be one or more of an IP address of the SSF or an FQDN that may search for the SSF.

The RAN may store SSF information together with the AMF information (404).

Through the above procedure, the RAN may update or add configuration information of the RAN or information related to the slice (support TA, S-NSSAI, etc.) (405).

The RAN may perform a RAN setup (NG' setup) procedure when a new relationship and connection is required for slice configuration and management with the SSF or may perform a RAN configuration update procedure when there is an existing connection (406). In this case, the request message transmitted by the RAN may include a name and an identifier of the RAN, and a list of TAs supported by the RAN. The list of TAs may include one or more S-NSSAI supported by the corresponding TA for each TA. Further, the RAN may include information on a target AMF to which the corresponding information is to be applied in the request message. The AMF target information may be a list of GUAMIs, or AMF region information, or a combination of an AMF region and set information. The SSF, having received the information may store slice information of the RAN, and when there is information required to be transmitted to an AMF to be targeted, the SSF may perform a process for transferring the information.

Figure 5:
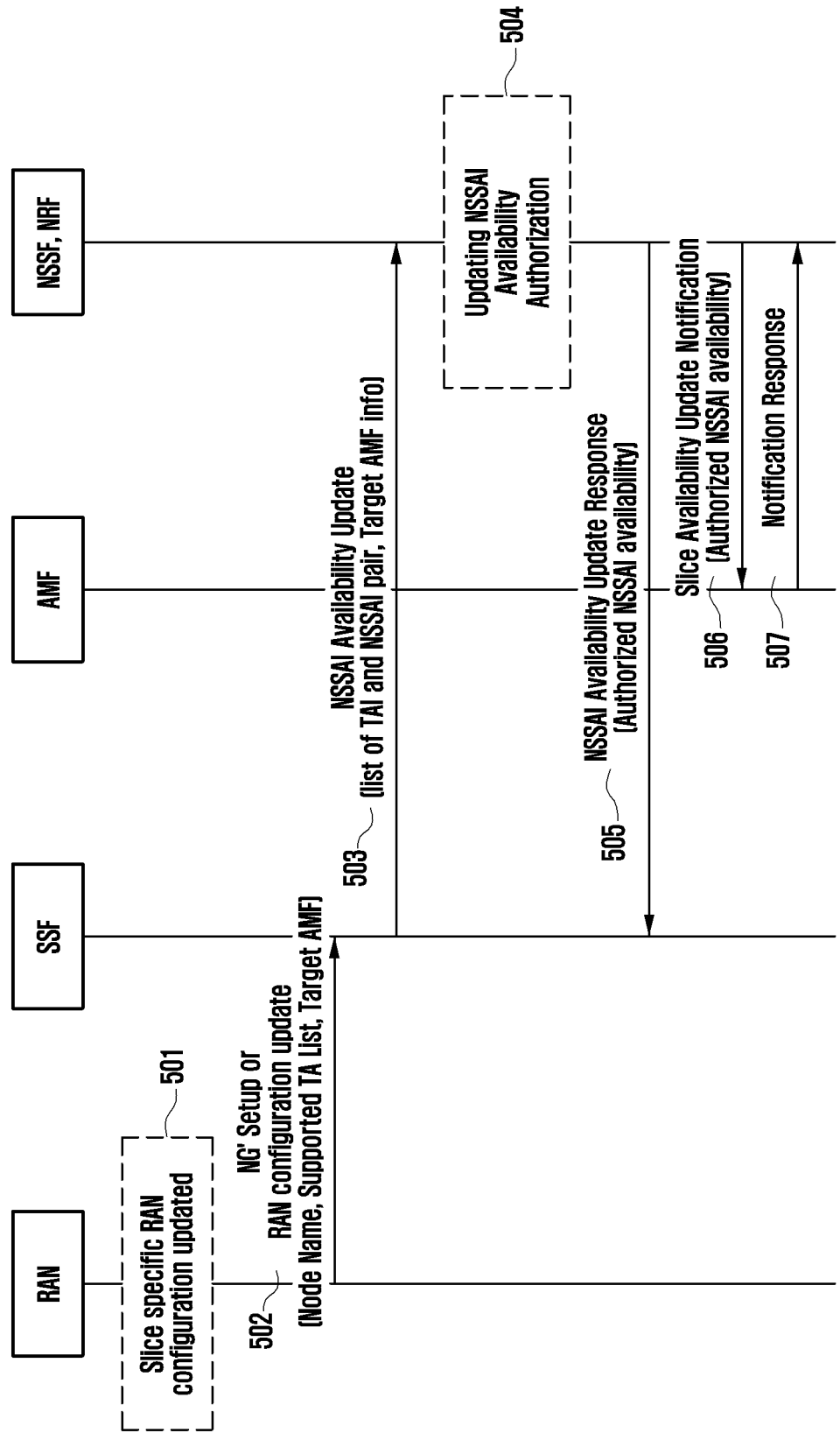
FIG. 5 illustrates a message flow diagram of an operation of effectively reflecting a configuration update of a RAN to a core network using an SSF.

FIG. 5 illustrates a message flow diagram of an operation of effectively reflecting a configuration update of a RAN to a core network using an SSF.

With reference to FIG. 5, the RAN may be newly added or configuration information or information (support TA, S-NSSAI, etc.) related to a slice may be updated or added (501).

The RAN may perform a RAN setup (NG' setup) procedure when a new relationship and connection for slice configuration and management with the SSF is required or may perform a RAN configuration update procedure when there is an existing connection (502). In this case, the request message transmitted by the RAN may include a name and an identifier of the RAN, and a list of TAs supported by the RAN. The list of TAs may include one or more S-NSSAI supported by the corresponding TA for each TA. Further, the RAN may include information on a target AMF to which the corresponding information is to be applied in the request message. The AMF target information may be a list of GUAMIs or AMF region information, or a combination of AMF region and set information. The SSF, having received the information may store slice information of the RAN.

When the slice information is added/updated and needs to notify this to the core network, the SSF may perform an operation for this (503). In particular, the SSF may transfer information to slice instances that fit the slice within the core network, an NSSF that selects an AMF, or an NRF that help select an NF within the core network. The SSF may determine whether network slice and TA information are added or updated according to information received from the RAN to be considered in the slice selection process. When a network configuration for slice selection is updated, the SSF may call a service for NSSAI availability update to the NSSF (or may be replaced with an NF that manages and finds network status information such as an NRF and an SCP). Network slice selection assistance information (NSSAI) may be configured with one or more S-NSSAI. The service request message may include a list of TAI and NSSAI to be added or updated. Further, the service request message may include information of an AMF to which slice information is to be applied. The AMF target information may be a list of GUAMIs or AMF region information, or a combination of AMF region and set information.

When it is necessary to update slice and slice-supported region (TA) information according to a request of the SSF, the NSSF may update or add the slice and slice-supported region (TA) information (504). In this case, data stored by the NSSF may be identified using an identifier (ID) of the requested SSF instance. The NSSF may determine a time point (time) of application of the updated NS SAI Availability. Further, the NS SF may update authorized NS SAI availability info including information on slices and regions that are allowed or not allowed to use using previously stored information and received information.

The NSSF transmits a response to the request from the SSF, and when authorized slice information (AuthorizedNssaiAvailability) is updated or added, the NS SF may notify information including this (505). In this case, in order to match the updated availability application time point with several NFs, the NSSF may include the time information in the response message and transmit. The NF, having received the time information operates by applying updated information from when the corresponding time condition is satisfied.

The NSSF may update together NSSAI available information of other AMF instances belonging to the AMF to be a target (506). That is, the NSSF may update together NSSAI available information identified by the instance ID of the AMF included in the target AMF received from the SSF. Accordingly, authorized slice information for the corresponding AMF instance may be updated together, and when NSSAI availability information or AuthorizedNssaiAvailability is updated or added, the NS SF may transmit a message for notifying this to each AMF instance. This may be performed using an NSSAI availability update notification service. In this case, in order to match the updated availability application time point with other AMF instances, the NS SF may include and transmit the corresponding time information in a message to send to the AMF instance. The AMF, having received the time information operates by applying the updated information from when the corresponding time condition is satisfied.

The AMFs may transmit a response to the request of the RAN (507).

Figure 6:
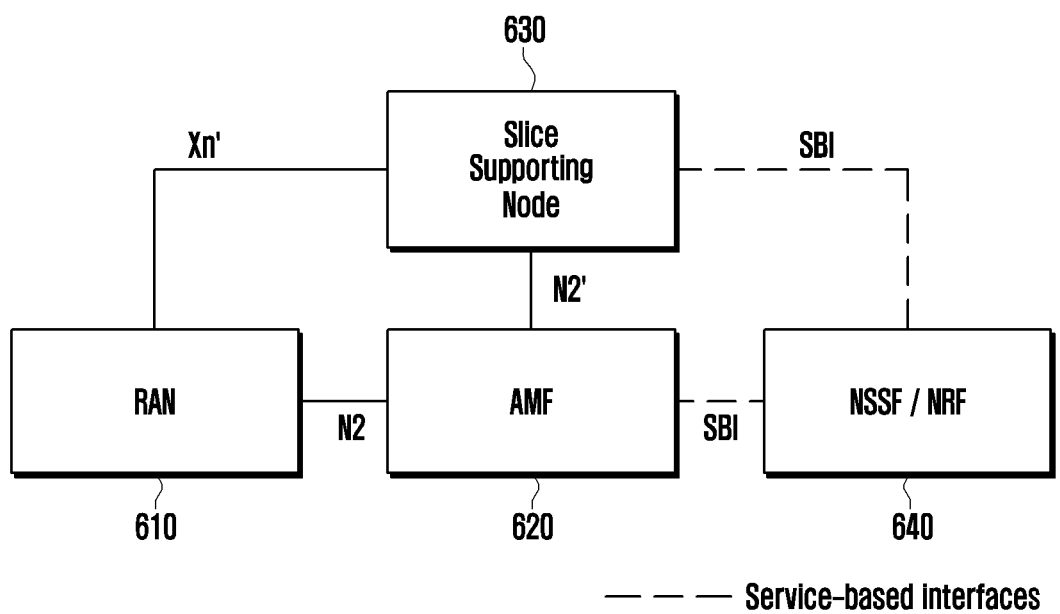
FIG. 6 illustrates a block diagram of a configuration of a network configuration according to another embodiment of the disclosure.

FIG. 6 illustrates a block diagram of a configuration of a network configuration according to another embodiment of the disclosure.

The network configuration includes a node (in the disclosure, referred to as a slice supporting node (SSN) 630) for transmitting information of a RAN 610 related to a network slice to a core network or selecting an AMF 620 capable of supporting the network slice. In this embodiment, the SSN 630 operates as a node of a RAN network, and is interconnected with another RAN as an Xn' (or X2') interface, the AMF 620 as an N2' (or S1') interface, and another core network NF 640 as a service-based interface (SBI).

Figure 7:
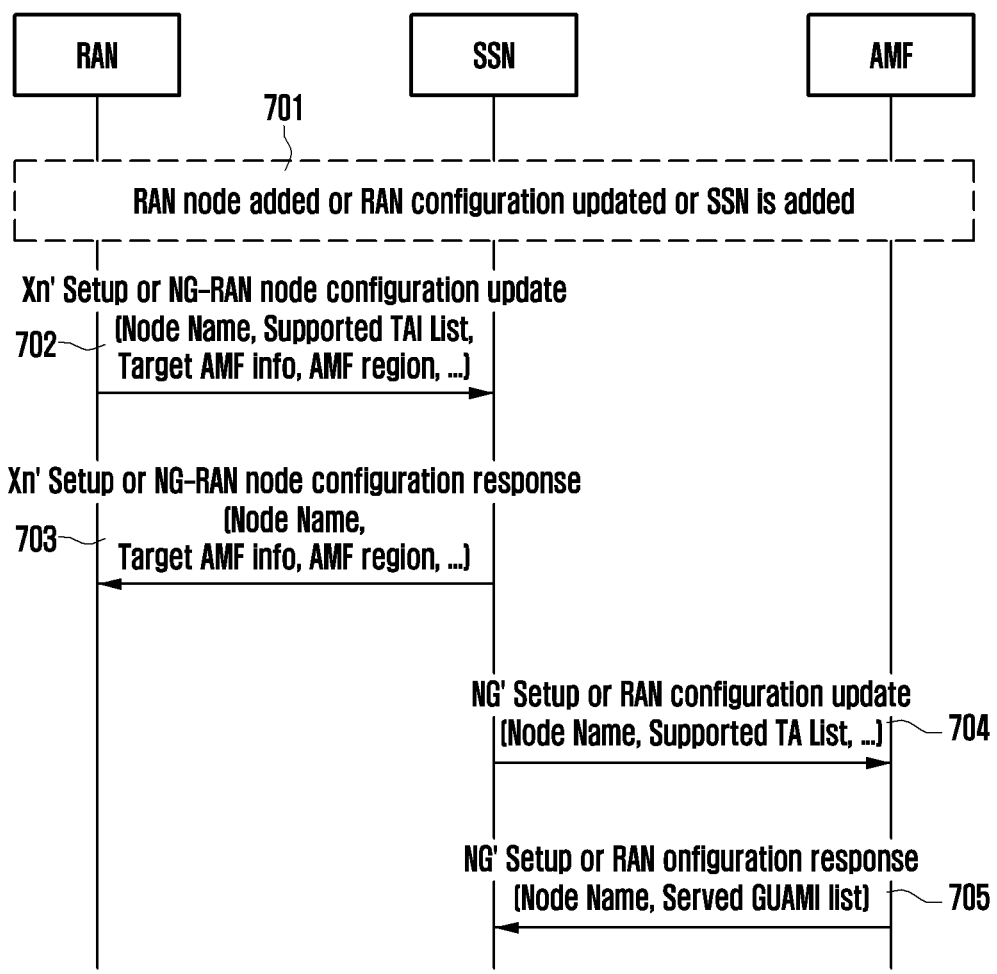
FIG. 7 illustrates a message flow diagram of an operation for interworking an SSN with a RAN and a core network according to an embodiment of the disclosure.

FIG. 7 illustrates a message flow diagram of an operation for interworking an SSN with a RAN and a core network according to an embodiment of the disclosure.

With reference to FIG. 7, a new RAN may be added to a network or a configuration of the RAN may be updated (701).

The RAN performs an Xn' setup procedure when a new relationship and connection for network configuration and management with the SSN is required, or performs a RAN configuration update procedure when there is an existing connection (702). In this case, a request message transmitted by the RAN may include a name and an identifier of the RAN, and a list of TAs supported by the RAN. The list of TAs may include one or more S-NSSAI supported by the corresponding TA for each TA. Further, the request message may include region information of an AMF to be interconnected by the RAN or information of an AMF to be targeted. The AMF target information may be a list of GUAMIs or AMF region information, or a combination of AMF region and set information. Further, the RAN may include, in the request message, an indicator indicating whether it supports a slice management selection operation using the SSN.

The SSN transmits a response to a request from the RAN, and in this case, the response includes configuration information of the SSN, and may include a name of the SSN and information of the target AMF to be interconnected with the SSN (703). AMF target information may be a list of GUAMIs or AMF region information, or a combination of AMF region and set information.

The SSN may perform an NG' setup procedure when a new relationship and connection for slice configuration and management with the AMF is required or may perform a RAN configuration update procedure when there is an existing connection (704). In this case, the request message transmitted by the SSN may include a name and an identifier of the SSN, and a list of TAs supported by the SSN, and the list of TAs may include one or more S-NSSAI supported by the corresponding TA for each TA. TA and slice information provided by the SSN may be generated using information received from the RAN. The AMF, having received the information may store slice information of the RANs, and perform a process for transferring the information when there is information required to be transmitted to another NF.

The AMF transmits a response message to the SSN, and in this case, the response may include information of the AMF, and a name of the AMF, a list of GUAMIs supported by the AMF, and information of a slice supported by the AMF (705). Slice information supported by the AMF may be used for selecting a slice or AMF to be accessed by the UE later. That is, the slice information may be used for selecting a slice or AMF to transfer a message (NAS message such as an initial UE message, registration request message, etc.) of the UE received from the RAN.

Figure 8:
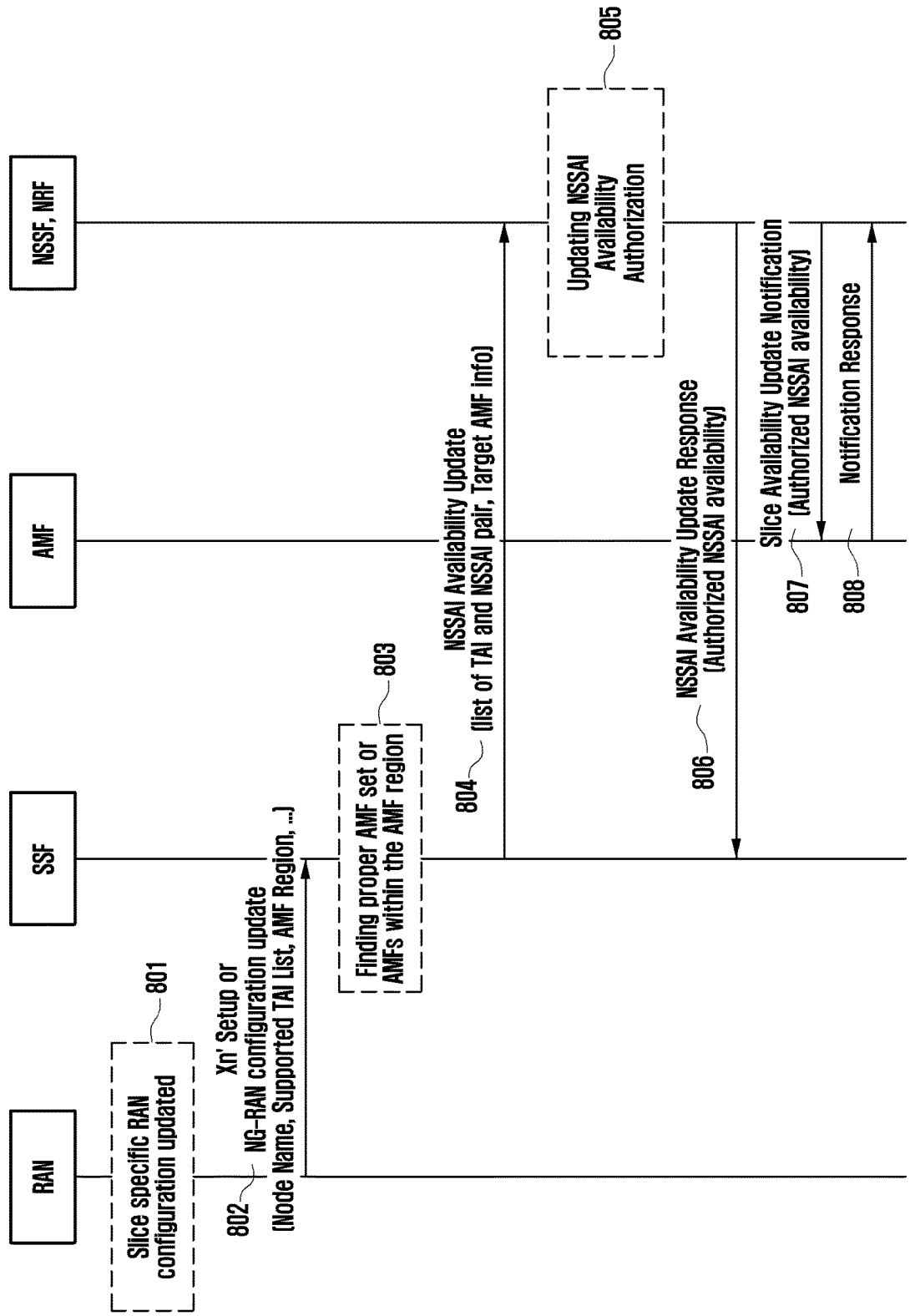
FIG. 8 illustrates a message flow diagram of a method of managing slice information through an SSN according to an embodiment of the disclosure.

FIG. 8 illustrates a message flow diagram of a method of managing slice information through an SSN according to an embodiment of the disclosure.

With reference to FIG. 8, the RAN may be newly added or configuration information or information (support TA, S-NSSAI, etc.) related to a slice may be updated or added (801).

The RAN may perform an Xn' setup procedure when a new relationship and connection for slice configuration and management with the SSN is required or may perform a RAN configuration update procedure when there is an existing connection (802). In this case, the request message transmitted by the RAN may include a name and an identifier of the RAN, and a list of TAs supported by the RAN. The list of TAs may include one or more S-NSSAI supported by the corresponding TA for each TA. Further, the RAN may include information on a target AMF to which the corresponding information is to be applied in the request message. AMF target information may be a list of GUAMIs or AMF region information, or a combination of AMF region and set information. The SSN, having received the information may store slice information of the RAN.

When slice information is added/updated and it needs to notify this to the core network, the SSN may select AMFs to be a target (803). When the SSN includes only AMF region information in information received from the RAN, the SSN may select an AMF set or AMF instance belonging to the AMF region.

The SSN may transfer slice information to a slice instance that fits the slice within a core network, an NSSF that selects an AMF, or an NRF that helps select an NF within a core network (804). The SSN may determine whether network slice and TA information are added or updated according to information received from the RAN to be considered in a slice selection process. When a network configuration for slice selection is updated, the SSN may call a service for NSSAI Availability Update with the NS SF (or may be replaced with an NF that manages and finds network status information such as an NRF and an SCP). Network slice selection assistance information (NSSAI) may be configured with one or more S-NSSAI. The service request message may include a list of TAI and NSSAI to be added or updated. Further, the service request message may include information of an AMF to which slice information is to be applied. AMF target information may be a list of GUAMIs, AMF region information, or a combination of AMF region and set information.

When it is necessary to update a slice and slice-supported region (TA) information according to a request of the SSN, the NSSF may update or add the information (805). In this case, data stored by the NSSF may be identified using an identifier (ID) of a requested SSN instance. The NSSF may determine a time point (time) of application of the updated NSSAI Availability. Further, the NSSF may update authorized NSSAI availability info including information on slices and regions that are allowed or not allowed to use using previously stored information and received information.

The NSSF transmits a response to the request of the SSF, and when authorized slice information (AuthorizedNssaiAvailability) is updated or added, the NSSF may notify information including this (806). In this case, in order to match the updated availability application time point with various NFs, the NSSF may include the corresponding time information in the response message and transmit the message. The NF, having received the time information operates by applying the updated information from when the corresponding time condition is satisfied.

The NSSF may update together NSSAI available information of other AMF instances belonging to the AMF to be a target (807). That is, the NSSF may update together NSSAI available information identified by the instance ID of the AMF included in a target AMF received from the SSF. Accordingly, authorized slice information for the corresponding AMF instance may be updated, and when NSSAI availability information or AuthorizedNssaiAvailability is updated or added, the NSSF may transmit a message for notifying this to each AMF instance. This may be performed using an NSSAI availability update notification service. In this case, in order to match the updated availability application time point with other AMF instances, the NSSF may include and transmit the corresponding time information in a message to transmit to the AMF instance. The AMF, having received the time information operates by applying the updated information from when the corresponding time condition is satisfied.

The AMFs may transmit a response to the request of the RAN (808).

Figure 9A:
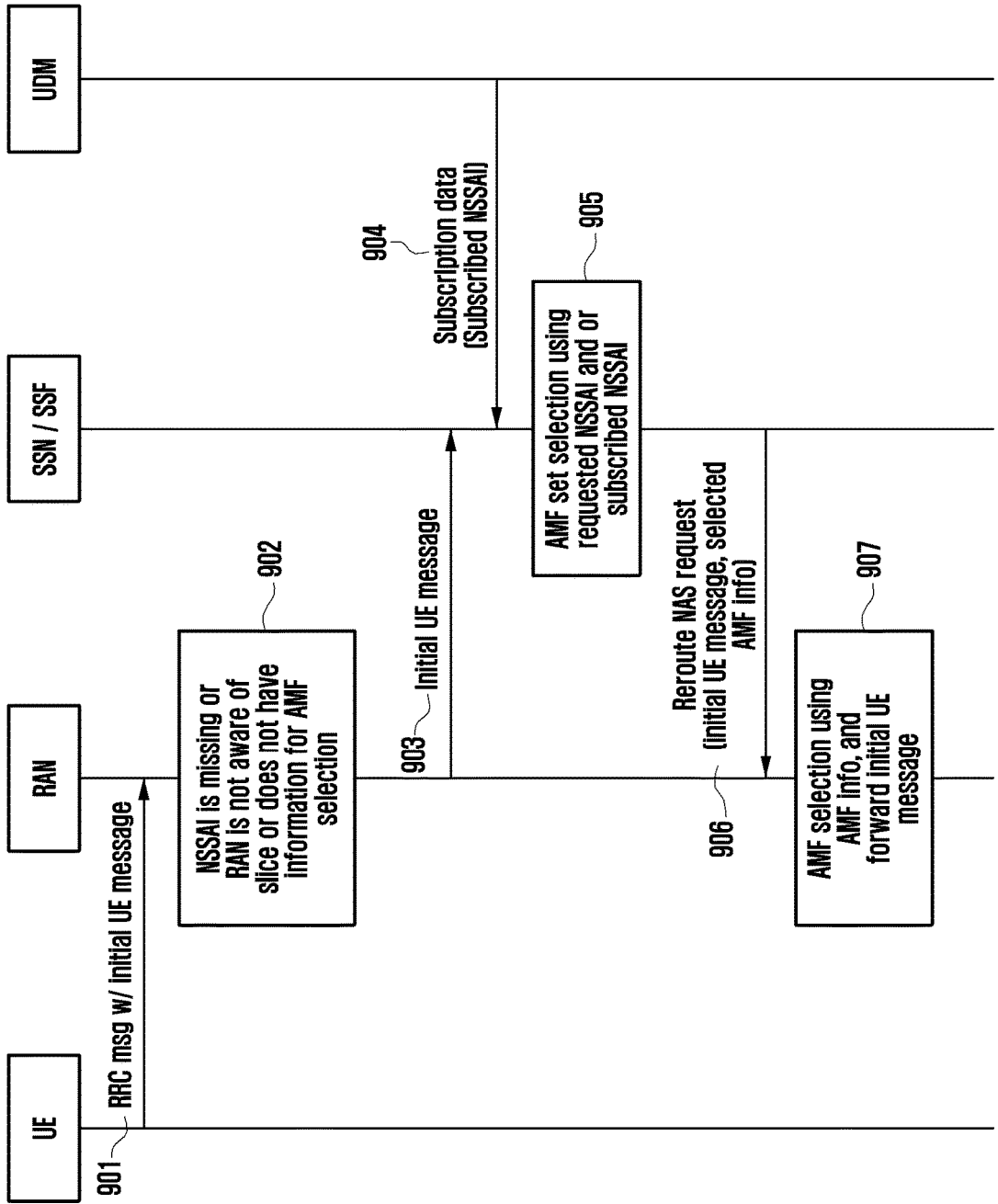
FIG. 9A illustrates a message flow diagram of an overall operation of selecting a slice and an AMF using an SSN or an SSF according to an embodiment of the disclosure.
Figure 9B:
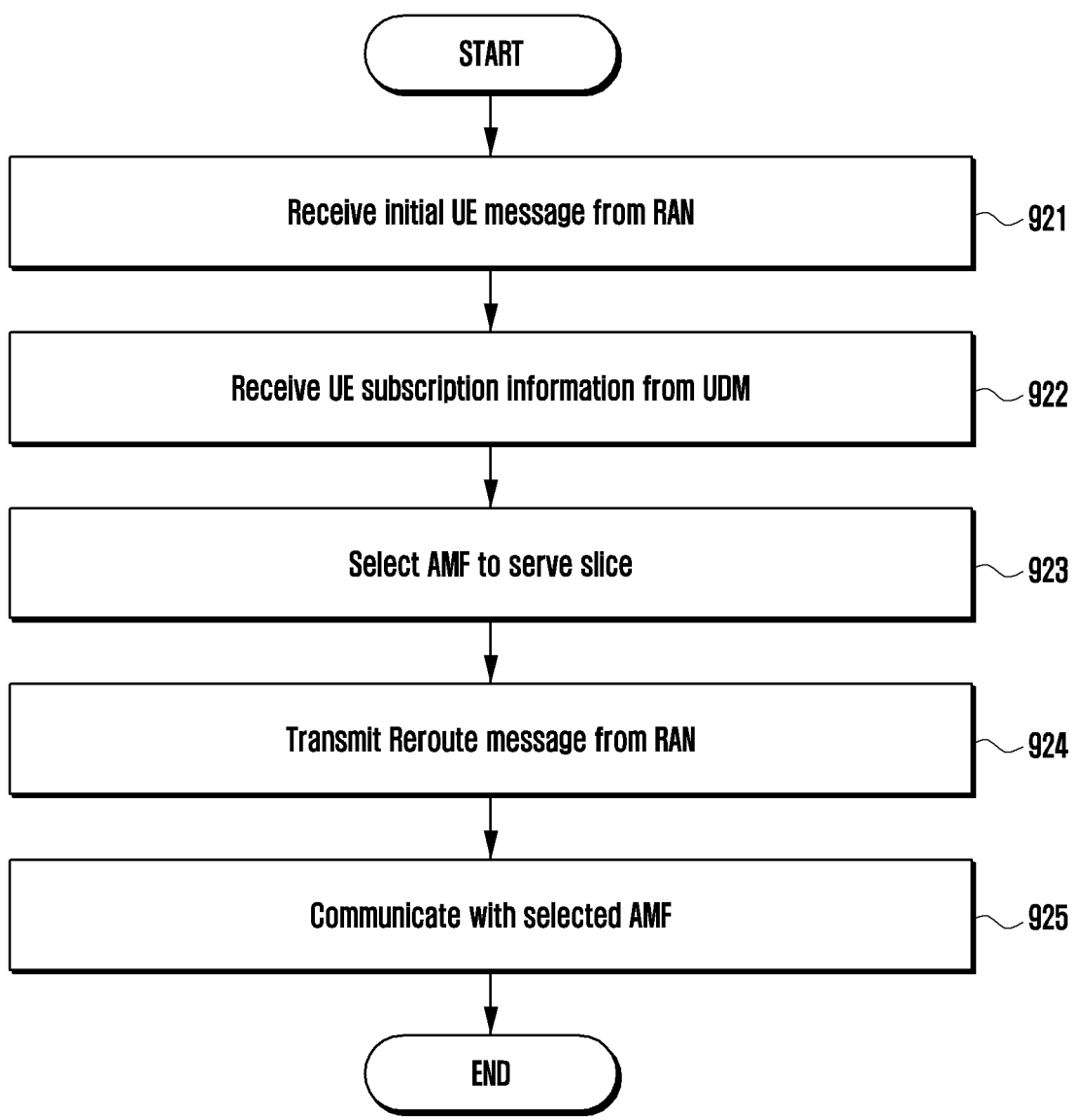
FIG. 9B illustrates a flowchart of an operation of selecting a slice and an AMF by an SSN or an SSF according to an embodiment of the disclosure.

FIG. 9A illustrates a message flow diagram of an overall operation of selecting a slice and an AMF using an SSN or an SSF according to an embodiment of the disclosure, and FIG. 9B illustrates a flowchart of an operation of selecting a slice and an AMF by an SSN or an SSF according to an embodiment of the disclosure.

First, an entire process of selecting a slice and an AMF using an SSN (or SSF) according to the disclosure will be described with reference to FIG. 9A.

The UE may transmit an RRC message including a NAS message for registration to the RAN (901). In this case, in order to use a service, the UE may include slice information (NSSAI) to access as an AS layer or NAS layer parameter.

The RAN may select an AMF using an identifier (ID) used by the UE, slice information to which the UE intends to access, and configuration information. When the RAN cannot select an AMF using the slice information or when AS layer slice information is not included in a message transmitted by the UE (902), the RAN may select an SSN (or SSF) and transmit an initial UE message transmitted by the UE to the SSN (or SSF) (903).

The SSN (or SSF) may receive subscription information from a UDM, as needed, and in this case, slice information applicable to a subscriber, Subscribed S-NSSAI, and the like may be received (904). When the UE message includes slice information (e.g., Requested NSSAI and/or subscribed NSSAI) selected by the UE, the SSN may consider this and select an AMF in consideration of the subscription information received from the UDM (905). When the AMF is selected, the SSN may transmit, to the RAN, a reroute NAS message including information (e.g., AMF information, AMF set information, or GUAMI) that can identify the AMF and an initial UE message (or registration request) transmitted by the UE (906).

The RAN may reselect the AMF to transmit a request of the UE using information received from the SSN (or SSF) (907). When one AMF is designated and interworking with the corresponding AMF is possible, the RAN may select the corresponding AMF. When AMF set information is received, the RAN may select one AMF among AMF sets. The RAN retransmits a UE message to the selected AMF.

FIG. 9B illustrates an operation of an SSN (or SSF) according to a time series flow in relation to the embodiment described with reference to FIG. 9A.

With reference to FIG. 9B, the SSN (or SSF) may receive an RRC message including a NAS message transmitted by the UE to the RAN for registration from the RAN (921). The UE message transmitted by the UE to the RAN may include a subscriber identifier (ID), slice information to which the UE intends to access, and configuration information.

If necessary, the SSN (or SSF) may receive subscription information of the UE from the UDM using information (e.g., subscriber identifier) included in the UE message received from the RAN (922). In this case, slice information applicable to a subscriber and subscribed S-NSSAI may be received.

When the UE message includes slice information (e.g., requested NSSAI and/or subscribed NSSAI) selected by the UE, the SSN (or SSF) may consider the slice information and select the AMF to serve the slice to the UE in consideration of subscription information received from the UDM (923).

When AMF selection is complete, the SSN (or SSF) may transmit, to the RAN, a Reroute NAS message responding to an initial request message of the UE including information (e.g., AMF information, AMF set information or GUAMI) that can identify the AMF and a UE message (Initial UE message or Registration request) transmitted by the UE (924).

The RAN, having received the reroute NAS message identifies an AMF to serve the UE using information included in the message, and transmits an initial request message of the UE to the selected AMF; thus, communication between the UE and the selected AMF may be initiated (925).

Figure 10:
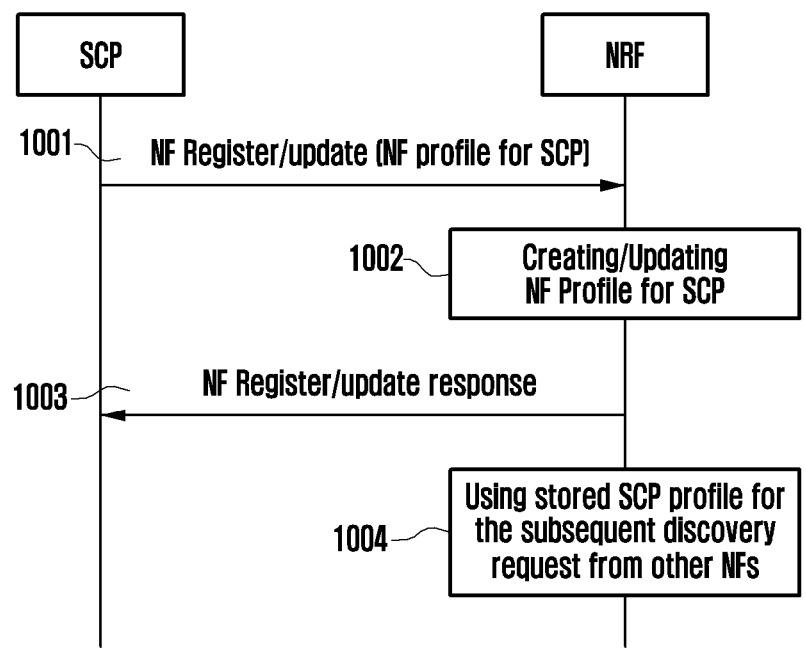
FIG. 10 illustrates a message flow diagram of a method of adding information on an SCP to an NRF according to an embodiment of the disclosure.

FIG. 10 illustrates a message flow diagram of a method of adding information on an SCP to an NRF according to an embodiment of the disclosure.

With reference to FIG. 10, in order to register information of the SCP and transmit information of the SCP when requesting another NF, the SCP may transmit a request message requesting NF register (new) or update (change) to the NRF (1001). In this case, the request message transmitted by the SCP may include an SCP Profile (NF ID and address of the SCP, a communication mode of the SCP, connection information with other SCPs, and NF information interconnected with the SCP) including parameters, features, and configuration information of the SCP, and function supported features information supported by the SCP. The supported feature information may include whether to support each of indirect communication, delegated discovery, and binding indication of the SCP. The supported feature may be included in a part of the NF Profile, or may be separated from a part of the NF Profile and included in the request message in a separate data format. Further, when the SCP belongs to a specific NW Slice, the SCP may include one or more identifiers (S-NSSAI) of the slice to be a target. Interconnected NF information and SCP information may include an ID and address of the interconnected NF/SCP, and include information indicating the order of connection between each NF/SCP in a network configuration interconnected with multiple hops. The registration request may be processed with specifying a type (NF Type) thereof as an SCP when requesting an NF Register/Update to the NRF, regarding the SCP as one NF type, or may be processed as a separate SCP register/update request.

The NRF may store/update information of the SCP using the received information (1002) and transmit a response to the request to the SCP (1003). The response message may include an updated supported feature that can be used in a network in which the SCP is currently registered. Contents and message configuration that may be included in the supported feature may be the same as those included in the request message. Further, the response of the NRF may include information (profiles, supported features, etc. of other connected SCPs) to be additionally applied when the SCP communicates with other NFs.

When the NRF receives a discovery request for an SCP from another NF or a discovery request for configuration information about a specific slice, the NRF may provide information using information of the stored SCP (1004). When the NRF receives a discovery request for a specific NF or NF service from the NF, if a candidate NF or NF service selected according to a request of the NRF has an interconnected SCP, the NRF may transfer together a selected NF or NF service and information (SCP ID, SCP address, operation communication mode) of the SCP upon responding. When a connection between the NF and the SCP is configured with multiple hops in the network configuration, a discovery response may transfer only information on NF (or SCP) of a next hop from the viewpoint of the NF (or SCP) requesting discovery, or may include all information of NF (or SCP) on the transmission path including the order of each hop.

Figure 11:
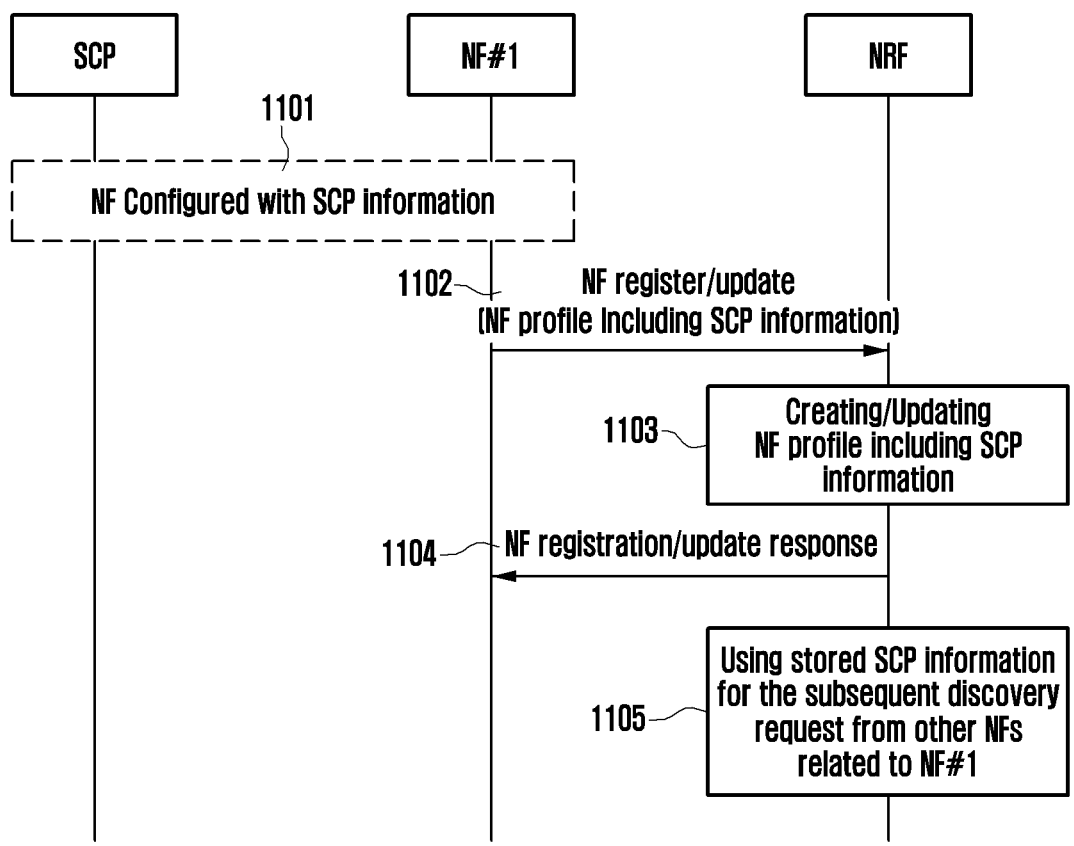
FIG. 11 illustrates a message flow diagram of a method of performing information on an SCP in an NRF by an NF during a registration process according to an embodiment of the disclosure.

FIG. 11 illustrates a message flow diagram of a method for an NF to perform information on an SCP in an NRF during a registration process thereof according to an embodiment of the disclosure.

With reference to FIG. 11, the NF may receive setting information of information (SCP ID, SCP address, SCP support function, etc.) of an SCP interconnected therewith (1101). The information may be obtained by receiving a message from the SCP, obtained through an OAM system, or stored inside the NF setting information.

The NF may register information thereof and information of the interconnected SCP, and transmit an NF register (new) or update (change) request to the NRF in order to transmit information thereof when requesting another NF (1102). In this case, a request message transmitted by the NF to the NRF may include not only an NF profile thereof, but also a profile (NF ID of the SCP, address of the SCP, communication mode of the SCP, connection information with other SCPs, etc.) of the SCP including parameters, features, and setting information of the SCP interconnected with the NF, and supported features information supported by the SCP.

The supported feature information may include whether to support each of indirect communication, delegated discovery, and binding indication of the SCP. Supported features may be included in a part of the profile of the SCP or may be separated from a part of the profile of the SCP and included in the request message in a separate data format. Further, when the SCP belongs to a specific NW Slice, the SCP may include one or more identifiers of the slice to be a target. The information of the interconnected SCP may include an ID and address of the interconnected SCP, and may include information indicating the order of connection between NF/SCPs in a network configuration interconnected with multiple hops. The profile of the SCP may be included as part of a NF Profile of the NF or may be classified as a separate data type to be included in the request message.

The NRF may store/update information of the NF and the interconnected SCP using the information received from the NF (1103), and transmit a response to a request of the NF (1104).

When the NRF receives a discovery request for an SCP from another NF or a discovery request for configuration information about a specific slice, the NRF may provide information using the stored SCP information (1105). Alternatively, when the NRF receives a discovery request for a specific NF or NF service from the NF, if a candidate NF or NF service selected according to a request of the NRF has an interconnected SCP, the NRF may transfer information about the SCP (SCP ID, SCP address, operation communication mode) together with the selected NF or NF service information when responding. When a connection between the NF and the SCP is configured with multiple hops in the network configuration, a discovery response may transfer only information on an NF (or SCP) of a next hop from the viewpoint of the NF (or SCP) requesting discovery or may include all information of the NF (or SCP) on the transmission path including the order of each hop.

Figure 12:
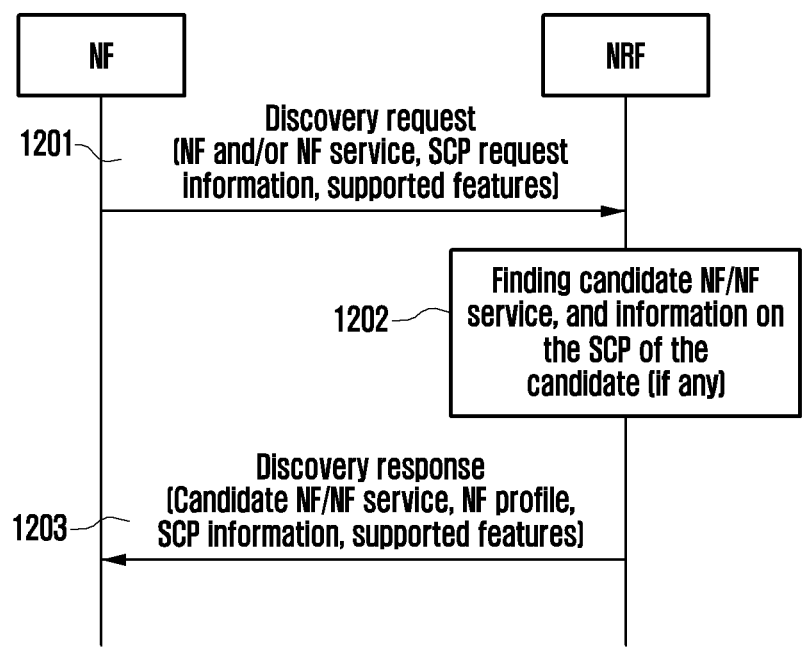
FIG. 12 illustrates a message flow diagram of a method for an NF to receive information of another NF through an NRF according to an embodiment of the disclosure.

FIG. 12 illustrates a message flow diagram of a method for an NF to receive information of another NF through an NRF according to an embodiment of the disclosure.

With reference to FIG. 12, one NF of a network (that can operate as a consumer or producer) may transmit a discovery request for finding or selecting another NF or NF service or receiving information to the NRF (1201). In this case, a request message transmitted by the NF may include information on the NF or NF service to be a target of discovery, supported features information supported by the requesting NF, and information indicating that SCP information is additionally requested together. The supported feature information may include indirect communication, delegated discovery, SM context transfer, binding indication, and whether each of NF sets is supported as enhancements to SBA among NF support functions. Further, when the requesting NF needs to receive SCP information about a specific NW Slice, the requesting NF may include an identifier of a slice to be a target in the request message.

The NRF may search for an NF or NF service that satisfies a condition for the request of the NF (1202), and transmit a response (1203). When the request message received by the NRF includes information explicitly notifying that SCP information is requested together, the response message may include information (SCP address, NF ID, an identifier of the support slices of the SCP, a connection relationship between the SCP and other SCPs, etc.) of the SCP that may be used between the requested NF and the selected NF or NF service and a supported feature of the SCP, a communication mode (one of modes A, B, C, and D) of the NF using the SCP, whether to use in-direct communication, and whether to use delegated discovery. Even if there is no information explicitly indicating that SCP-related information is requested together in the message requested by the NF, when a supported feature of the requesting NF includes whether communication mode or in-direct communication using the SCP is used, and whether delegated discovery is used, the NRF may determine whether the SCP can be used based on the message, and include information related to the SCP in the response message and transferred. When a connection between the NF and the SCP in the network configuration is configured with multiple hops, the discovery response may transfer only information on the NF (or SCP) of the next hop from the viewpoint of the NF (or SCP) requesting discovery or include all information of NF (or SCP) on the transmission path including the order of each hop.

The NF may store information received from the NRF, and then use SCP-related information (whether to use SCP, SCP address, NF ID, in-direct communication, whether to use delegated discovery, etc.) received when communicating with the NF or NF services received by the response (not illustrated). When the response received from the NRF includes information that there is no SCP or does not include the SCP information, the NF may assume that there is no SCP upon subsequent operation.

Figure 13:
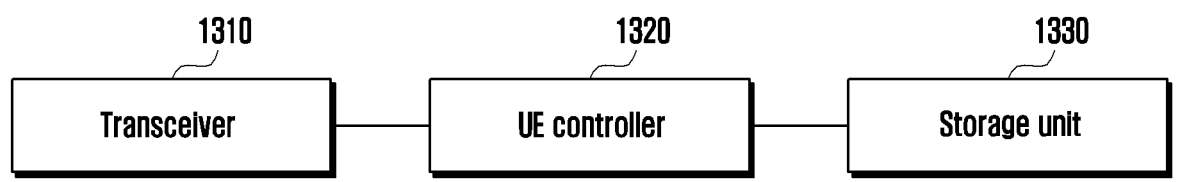
FIG. 13 illustrates a block diagram of a configuration of a UE device according to embodiments of the disclosure.

FIG. 13 illustrates a block diagram of a structure of a UE according to an embodiment of the disclosure.

With reference to FIG. 13, the UE may include a transceiver 1310, a UE controller 1320, and a storage unit 1330. In the disclosure, the UE controller 1320 may be defined as a circuit, an application specific integrated circuit, or at least one processor.

The transceiver 1310 may transmit and receive signals to and from other network entities. The transceiver may receive system information from, for example, a RAN, and receive a synchronization signal or a reference signal.

The UE controller 1320 may control an overall operation of the UE according to the embodiment proposed in the disclosure. For example, the UE controller may control a signal flow between blocks to perform an operation according to the above-described drawings and flowcharts. Specifically, the UE controller may operate according to a control signal from the RAN and exchange messages or signals with the UE and/or the network entity.

The storage unit 1330 may store at least one of information transmitted and received through the transceiver 1310 and information generated through the UE controller 1320.

Figure 14:
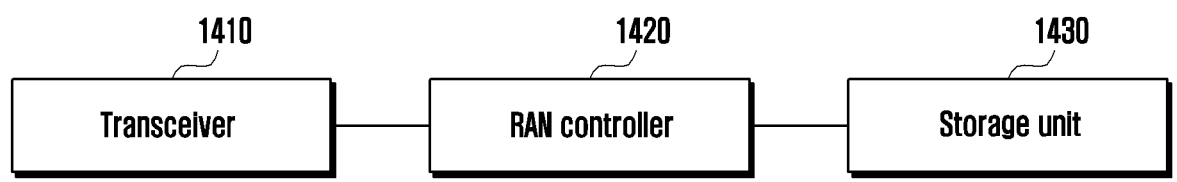
FIG. 14 illustrates a block diagram of a configuration of a RAN device according to embodiments of the disclosure.

FIG. 14 illustrates a block diagram of a structure of a RAN according to an embodiment of the disclosure. The RAN illustrated in FIG. 14 may include the above-described SSN.

With reference to FIG. 14, the RAN may include a transceiver 1410, a RAN controller 1420, and a storage unit 1430. In the disclosure, the RAN controller 1420 may be defined as a circuit, an application specific integrated circuit, or at least one processor.

The transceiver 1410 may transmit and receive signals to and from other network entities. The transceiver may transmit, for example, system information to the UE, transmit a synchronization signal or a reference signal, and receive information for providing a service to the UE from the NF.

The RAN controller 1420 may control an overall operation of the RAN according to the embodiment proposed in the disclosure. For example, the RAN controller may control a signal flow between blocks to perform an operation according to the above-described drawings and flowcharts. Specifically, the RAN controller may exchange messages or signals with a UE, a RAN, and/or a network entity.

The storage unit 1430 may store at least one of information transmitted and received through the transceiver and information generated through the RAN controller.

Figure 15:
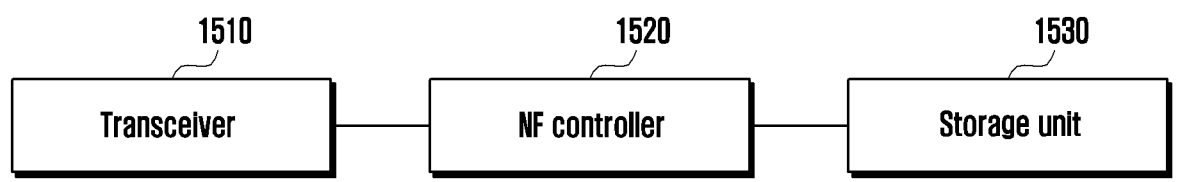
FIG. 15 illustrates a block diagram of a configuration of an NF device according to embodiments of the disclosure.

FIG. 15 illustrates a block diagram of a structure of an NF (including an NF instance) according to an embodiment of the disclosure. The NF illustrated in FIG. 15 may include at least one of the above-described SSF, AMF, NSSF, NRF, SCP, and UDM, and is not limited to a specific NF.

With reference to FIG. 15, the NF may include a transceiver 1510, an NF controller 1520, and a storage unit 1530.

The transceiver 1510 may transmit and receive signals with other network entities. The transceiver may transmit, for example, system information to a RAN, and transmit a synchronization signal or a reference signal.

The NF controller 1520 may control an overall operation of the NF according to an embodiment proposed in the disclosure.

The storage unit 1530 may store at least one of information transmitted and received through a transceiver and information generated through a RAN controller.

Methods according to embodiment described in claims and/or a specification of the disclosure may be implemented in a form of hardware, software, or a combination of hardware and software.

When implemented with software, a computer readable storage medium that stores at least one program (software module) may be provided. At least one program stored at the computer readable storage medium may be configured for executing by at least one processor within the electronic device. At least one program may include instructions that enable the electronic device to execute methods according to embodiment described in claims and/or a specification of the disclosure.

Such a program (software module, software) may be stored at a non-volatile memory including a random access memory (RAM) and a flash memory, a read-only memory (ROM), an electrically erasable and programmable ROM (EEPROM), a magnetic disk storage device, a compact disk ROM (CD-ROM), a digital versatile disk (DVD), an optical storage device of other form, and a magnetic cassette. Alternatively, the program may be stored at a memory configured with a combination of a portion or all thereof. Further, each constituent memory may be included in the plural.

Further, the program may be stored at an attachable storage device that may access through a communication network such as Internet, Intranet, a local area network (LAN), a wide area network (WAN), or a storage area network (SAN), or a communication network configured with a combination thereof. Such a storage device may be connected to a device performing an embodiment of the disclosure through an external port. Further, a separate storage device on the communication network may access to a device performing an embodiment of the disclosure.

In the above-described specific embodiments of the disclosure, components included in the disclosure are expressed in the singular or the plural according to the proposed specific embodiments. However, the singular or plural expression is selected appropriately for a situation proposed for convenience of description, and the disclosure is not limited to the singular or plural constituent elements, and even constituent elements expressed in the plural are configured with the singular or even constituent elements expressed in the singular may be configured with the plural.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a service communication proxy (SCP) in a communication system, the method comprising:
transmitting, to a network repository function (NRF), a network function (NF) register request message including an SCP profile of the SCP; and
receiving, from the NRF, an NF register response message including a result of a registration for the SCP,
wherein the SCP profile includes an NF type set to type SCP, an NF identifier of the SCP, and NF information associated with at least one NF served by the SCP.

2. The method of claim 1, wherein the SCP profile further includes at least one of an address of the SCP or information associated with at least one other SCP connected with the SCP.

3. The method of claim 1, wherein the SCP profile further includes a network slice related identifier associated with the SCP.

4. The method of claim 1, wherein the SCP profile is maintained at the NRF.

5. The method of claim 1, further comprising:
transmitting, to the NRF, an NF discovery request message associated with a producer NF; and
receiving, from the NRF, an NF discovery response message including information associated with the producer NF.

6. A service communication proxy (SCP) in a communication system, the SCP comprising:
a transceiver; and
a controller configured to:
transmit, to a network repository function (NRF) via the transceiver, a network function (NF) register request message including an SCP profile of the SCP, and
receive, from the NRF via the transceiver, an NF register response message including a result of a registration for the SCP,
wherein the SCP profile includes an NF type set to type SCP, an NF identifier of the SCP, and NF information associated with at least one NF served by the SCP.

7. The SCP of claim 6, wherein the SCP profile further includes at least one of an address of the SCP or information associated with at least one other SCP connected with the SCP.

8. The SCP of claim 6, wherein the SCP profile further includes a network slice related identifier associated with the SCP.

9. The SCP of claim 6, wherein the SCP profile is maintained at the NRF.

10. The SCP of claim 6, wherein the controller is configured to:
transmit, to the NRF, an NF discovery request message associated with a producer NF, and
receive, from the NRF, an NF discovery response message including information associated with the producer NF.

11. A method performed by a network repository function (NRF) in a communication system, the method comprising:
receiving, from a service communication proxy (SCP), a network function (NF) register request message including an SCP profile of the SCP; and
transmitting, to the SCP, an NF register response message including a result of a registration for the SCP, wherein the SCP profile includes an NF type set to type SCP, an NF identifier of the SCP, and NF information associated with at least one NF served by the SCP.

12. The method of claim 11, wherein the SCP profile further includes at least one of an address of the SCP or information associated with at least one other SCP connected with the SCP.

13. The method of claim 11, wherein the SCP profile further includes a network slice related identifier associated with the SCP.

14. The method of claim 11, wherein the SCP profile is maintained at the NRF.

15. The method of claim 11, further comprising:
receiving, from the SCP, an NF discovery request message associated with a producer NF; and
transmitting, to the SCP, an NF discovery response message including information associated with the producer NF.

16. A network repository function (NRF) in a communication system, the NRF comprising:
a transceiver; and
a controller configured to:
receive, from a service communication proxy (SCP) via the transceiver, a network function (NF) register request message including an SCP profile of the SCP, and
transmit, to the SCP, an NF register response message including a result of a registration for the SCP,
wherein the SCP profile includes an NF type set to type SCP, an NF identifier of the SCP, and NF information associated with at least one NF served by the SCP.

17. The NRF of claim 16, wherein the SCP profile further includes at least one of an address of the SCP or information associated with at least one other SCP connected with the SCP.

18. The NRF of claim 16, wherein the SCP profile further includes a network slice related identifier associated with the SCP.

19. The NRF of claim 16, wherein the SCP profile is maintained at the NRF.

20. The NRF of claim 16, wherein the controller is configured to:
receive, from the SCP, an NF discovery request message associated with a producer NF, and
transmit, to the SCP, an NF discovery response message including information associated with the producer NF.

* * * * *